United States Patent
Jia et al.

(10) Patent No.: US 10,954,163 B2
(45) Date of Patent: Mar. 23, 2021

(54) LIGHTWEIGHT HIGH-STRENGTH CERAMSITE AND PREPARATION METHOD THEREOF

(71) Applicant: GUANGDONG TSINGDA TONGKE ENVIRONMENTAL PROTECTION TECHNOLOGY CO., LTD., Guangdong (CN)

(72) Inventors: Yihai Jia, Guangdong (CN); Xihong Wang, Guangdong (CN); Siying Chen, Guangdong (CN); Chuanxing Wang, Guangdong (CN)

(73) Assignee: Guangdong Tsingda Tongke Environmental Protection Technology Co., Ltd., Guangdong (CN)

( * ) Notice: Subject to any disclaimer, the term of this patent is extended or adjusted under 35 U.S.C. 154(b) by 8 days.

(21) Appl. No.: 16/464,878

(22) PCT Filed: May 21, 2017

(86) PCT No.: PCT/CN2017/085243
§ 371 (c)(1),
(2) Date: May 29, 2019

(87) PCT Pub. No.: WO2018/107660
PCT Pub. Date: Jun. 21, 2018

(65) Prior Publication Data
US 2019/0322586 A1 Oct. 24, 2019

(30) Foreign Application Priority Data

Dec. 16, 2016 (CN) .......................... 201611163523.3

(51) Int. Cl.
| | |
|---|---|
| C04B 33/04 | (2006.01) |
| C04B 33/135 | (2006.01) |
| C04B 33/138 | (2006.01) |
| C04B 33/32 | (2006.01) |
| C04B 33/13 | (2006.01) |

(52) U.S. Cl.
CPC ............ *C04B 33/04* (2013.01); *C04B 33/131* (2013.01); *C04B 33/1305* (2013.01); *C04B 33/138* (2013.01); *C04B 33/1315* (2013.01); *C04B 33/1352* (2013.01); *C04B 33/32* (2013.01); *C04B 2235/3201* (2013.01); *C04B 2235/349* (2013.01); *C04B 2235/3418* (2013.01); *C04B 2235/3463* (2013.01); *C04B 2235/36* (2013.01); *C04B 2235/606* (2013.01); *C04B 2235/6562* (2013.01); *C04B 2235/6567* (2013.01)

(58) Field of Classification Search
CPC ............ C04B 35/1322; C04B 35/1352; C04B 35/138; C04B 33/1322; C04B 33/1352; C04B 33/138
See application file for complete search history.

(56) References Cited

U.S. PATENT DOCUMENTS

| | | | |
|---|---|---|---|
| 2019/0247824 A1* | 8/2019 | Lin | ...................... C04B 33/1321 |
| 2020/0048147 A1* | 2/2020 | Lin | ....................... C04B 18/023 |

FOREIGN PATENT DOCUMENTS

| | | |
|---|---|---|
| CN | 1896031 A | 1/2007 |
| CN | 102617097 A | 8/2012 |
| CN | 104261802 A | 1/2015 |
| CN | 104909799 A | 9/2015 |
| CN | 104945003 A | 9/2015 |
| CN | 106215854 A | 12/2016 |

OTHER PUBLICATIONS

International Search Report and Written Opinion dated Sep. 20, 2017 by the International Searching Authority for Patent Application No. PCT/CN2017/085243, which was filed on May 21, 2017 and published as WO 2018/107660 on Jun. 21, 2018 (Inventor—Jia et al.; Applicant—Tsinghua Dongguan Innovation Center et al.) (Original—7 pages; Translation—6 pages).

* cited by examiner

Primary Examiner — Karl E Group
(74) Attorney, Agent, or Firm — Ballard Spahr LLP

(57) ABSTRACT

A lightweight high-strength ceramsite, comprising solid raw materials and activator as the raw materials, which can be respectively expressed in parts by weight, the solid raw materials: 100 parts, the activator: 1-15 parts; wherein said solid raw materials comprise fly ash: 100 parts, high-alumina fly ash, bauxite and red mud: 6-18 parts, silica fume: 1-5 parts, surfactant: 0.1-3 parts, plasticizer: 6-24 parts; and said activator comprises alkali metal hydroxide: 5-20 parts and alkali metal silicate: 80-95 parts. The lightweight high-strength ceramsite product prepared has a density level of 700-1100 kg/m3 and cylindrical compressive strength of 10-20 MPa, and thus is not susceptible to damage.

9 Claims, No Drawings

LIGHTWEIGHT HIGH-STRENGTH CERAMSITE AND PREPARATION METHOD THEREOF

CROSS-REFERENCE TO RELATED APPLICATIONS

This application is a U.S. National Phase Application of International Application No. PCT/CN2017/085243, filed May 21, 2017, which claims priority to Chinese Application No. 201611163523.3, filed Dec. 16, 2016, each of which are hereby incorporated by reference in their entirety.

TECHNICAL FIELD

The present invention relates to the technical fields of environmentally-friendly buildings or building materials, solid waste disposal and resource utilization, and in particular to lightweight high-strength ceramsite and preparation method thereof.

BACKGROUND ART

1. Fly ash is solid waste produced from coal-fired power plants. In China about 600 million tons of fly ash is produced each year, with a comprehensive utilization rate of about 70%. Thus, a vast amount of fly ash has been accumulated every year. If such fly ash is not handled, it will result in dust to directly contaminate the atmosphere and pose a threat to human respiratory system. Furthermore, if the fly ash is discharged into water systems, toxic chemicals contained therein would contaminate domestic water and further threaten human health. Therefore, utilization of fly ash as a useful resource has been strongly supported by national and local governments.

2. Ceramsite is an artificial lightweight aggregate with excellent properties, such as low density, high cylindrical compressive strength, high softening coefficient, good frost resistance, and excellent resistance to alkali-aggregate reactivity, and thus it features a plurality of functions such as light weight, resistance to corrosion, frost and vibration, and good insulation. To make use of those excellent properties, it is possible to use ceramsite as a base material for building materials, as an concrete raw material in place of sandstone for preparing lightweight high-strength concretes, or for preparing lightweight wall boards, ceramic self-insulating blocks, sewage treatment filter media, planting matrices, or the like in a wide range of application areas.

3. Traditional ceramsites are in most cases produced via sintering using clay or shale as the main raw materials. This will inevitably consume a large amount of minerals (such as clay) and thus is disadvantageous for the protection of forest vegetation and farming fields, thereby failing to comply with the principle of sustainable development. Therefore, seeking for a waste material as the raw material for preparing ceramsite has become a hot topic in current researches.

4. Fly ash is enriched in $SiO_2$, $Al_2O_3$, $Fe_2O_3$, and CaO, which are similar to the chemical components of clay. Thus, it can be sintered to produce ceramsite. If fly ash is used as the raw material to prepare ceramsite, that solid waste can be fully utilized and converted into valuable materials.

5. Chinese Patent No. 201510273757.2, entitled "Lightweight high-strength ceramsite and preparation process thereof", discloses the production of lightweight high-strength ceramsite using kaolin tailings, coal gangue, and fly ash as raw materials, wherein the fly ash is used in an amount of 20-40 parts; the cylindrical compressive strength is 10 MPa or higher; and the bulk density is 800-900 g/cm³. Nevertheless, the amount of fly ash used in this process is low.

6. Chinese Patent No. 201410507652.4, entitled "High-strength ceramsite made from sludge and fly ash and preparation method thereof", discloses the preparation of high-strength ceramsite using sludge and fly ash as main raw materials, wherein the fly ash is used in an amount of 30-55 parts; the cylindrical compressive strength is 3-6.3 MPa; and the bulk density is 500-650 kg/m³. Nevertheless, the amount of fly ash used in this method is low and the cylindrical compressive strength is low.

7. Chinese Patent No. 200610086665.4, entitled "Lightweight, high-strength, fly ash-based ceramsite formulation", discloses the preparation of lightweight, high-strength, fly ash-based ceramsite from fly ash, binder and admixture, wherein the fly ash is used in an amount of 55-70%; and the cylindrical compressive strength may be up to 7.3 MPa. This method involves a higher amount of fly ash but the cylindrical compressive strength is low.

8. Chinese Patent No. 201510320491.2, entitled "Biological ceramsite and preparation method thereof", discloses the preparation of biological ceramsite from fly ash, plasticizer, slag, pore-forming agent and liquid activator, wherein the fly ash is used in an amount of 85%-95%; and the cylindrical compressive strength is 9-14 MPa. This method involves a higher amount of fly ash but the cylindrical compressive strength is low. Since the liquid activator is highly alkaline, it will have an unfavorable impact both on the apparatus and human health.

At present, high-strength ceramsite has the following problems:
1. Low cylindrical compressive strength;
2. Low amount of fly ash;
3. Hazardous liquid activator.

SUMMARY OF THE INVENTION

It is an object of the present invention to provide lightweight high-strength ceramsite with high cylindrical compressive strength and high fly ash amount, and preparation method thereof.

In order to achieve this object, the present invention provides the following technical solutions:

Lightweight high-strength ceramsite, comprising solid raw materials and activator as the raw materials, which can be respectively expressed in parts by weight, the solid raw materials: 100 parts, the activator: 1-15 parts; wherein said solid raw materials comprise fly ash: 100 parts, high-alumina fly ash, bauxite and red mud: 6-18 parts, silica fume: 1-5 parts, surfactant: 0.1-3 parts, plasticizer: 6-24 parts; and said activator comprises alkali metal hydroxide: 5-20 parts and 60-95% by weight of alkali metal silicate solution: 80-95 parts.

The fly ash comprises the following components, loss on ignition: 2-10%, $SiO_2$: 30%-70%, $Al_2O_3$: 10%-50%, CaO: 1%-15%, $Fe_2O_3$: 1%-18%, MgO: 0.01%-8%, and $TiO_2$: 0.01%-3%.

The plasticizer is one or more selected from the group consisting of Guangdong white clay, Guangdong black clay, kaolin, bentonite, PVA, and cellulose.

The high-alumina fly ash and bauxite comprise an alumina content of not less than 37%; and the weight ratio of red mud to high-alumina fly ash and bauxite is 1:2-5.

The solid raw materials further comprise iron ore tailings: 0.01-5 parts and calcite: 0.01-5 parts.

The alkali metal hydroxide is one or more selected from the group consisting of sodium hydroxide, potassium hydroxide and lithium hydroxide.

The alkali metal silicate in the alkali metal silicate solution is one or more selected from the group consisting of sodium silicate, potassium silicate and lithium silicate.

The surfactant is sodium lignosulfonate.

A method for preparing lightweight high-strength ceramsite, comprising the following steps:

a. Weighing the solid raw materials and mixing the same, and preparing a solid activator: dissolving alkali metal hydroxide in the alkali metal silicate solution, after cooling to room temperature, continuing stirring until small amount of white precipitates are observed, pouring the resulting solution into a clean container; the white crystals are formed at room temperature for 1-20 minutes into agglomerates, which are pulverized to form a solid activator;

b. Mixing: mixing the solid raw materials and the solid activator thoroughly to form mixed materials;

c. Pelletizing: pelletizing the mixed materials into particles;

d. Curing: maintaining the particles under the conditions with a temperature of 70-100° C. and a humidity of 70-90% for 1-2 hours to be cured;

e. Drying: drying the cured particles at a temperature of 100-300° C.;

f. Sintering: subjecting the dried particles to a predetermined sintering process for 60-90 min;

g. Forming finished product: cooling the sintered particles to room temperature to yield lightweight high-strength ceramsite as the finished product.

The sintering process comprises specific steps of elevating the temperature from 100-300° C. at a rate of 20-40° C./min to 500-700° C., and subsequently further elevating the temperature to 1050-1350° C. at a rate of 5-25° C./min.

The present invention has the following advantages:

1. The raw materials can be mixed and pelletized directly without being subjected to ball milling, thus minimizing energy consumption and omitting processing steps;

2. As the particles are initially cured and then sintered, the sintering process does not result in dust and leads to minimal contamination;

3. The product features lightweight and high strength, with a density level of 700-1100 kg/m$^3$ and cylindrical compressive strength of 10-20 MPa, and thus is not so susceptible to damage; it can be used as a lightweight aggregate for preparing high-performance concrete, or as a load-bearing structure suitable for use in building wall boards, bridges, pipes and other applications;

4. High-alumina fly ash with high amount of alumina and bauxite are added to the solid raw materials of the present invention to increase the strength of the materials;

5. Surfactant is further added to the solid raw materials of the present invention to improve the mixing effect of the solid raw materials and the solid activator. Thus, the resulting ceramsite has more homogenous performance and more stable quality;

6. The solid activator used in the present invention is easier to handle than liquid activator. Since the liquid activator is highly alkaline, it easily corrodes the apparatus and is hazardous to human health.

MODE FOR CARRYING OUT THE INVENTION

In order to illustrate the present invention in more detail, the following preparation examples are described. However, the scope of the present invention is not limited thereto.

Example 1

Weighing solid materials: 850 g of fly ash, 20 g of Guangdong white clay, 100 g of high-alumina fly ash, 30 g of silica fume, and 8 g of sodium lignosulphonate; and these solid raw materials were mixed;

Preparing an Activator:

5 g of sodium hydroxide and 40 g of 80% sodium water glass solution were weighed. Sodium hydroxide was added in the sodium water glass solution to be dissolved under stirring. After cooling to room temperature, stirring was continued until small amount of white precipitates were observed. The resulting solution was poured into a clean container; the white crystals were formed at room temperature for 1-20 minutes into agglomerates, which were pulverized to form a solid activator;

Mixing: the solid raw materials and the solid activator were thoroughly mixed to form mixed materials;

Pelletizing: the mixed materials were pelletized into particles;

Curing: the particles were maintained under the conditions with a temperature of room temperature to 100° C. and a humidity of 70-90% for 1-2 hours to be cured;

Drying: the cured particles were dried at a temperature of 120° C.;

Sintering: the dried particles were sintered at a temperature of 1250° C. Specifically, the sintering process was carried out by the steps of elevating the temperature from 120° C. at a rate of 25° C./min to 600° C., and subsequently further elevating the temperature to 1250° C. at a rate of 15° C./min.

Forming finished product: the sintered particles were cooled to room temperature to yield ceramsite as the finished product of Example 1.

Example 2

Weighing solid materials: 880 g of fly ash, 40 g of bauxite, 10 g of sodium lignosulphonate, and 70 g of bentonite; and these solid raw materials were mixed;

Preparing a Solid Activator:

15 g of potassium hydroxide and 87 g of 90% potassium water glass solution were weighed. Potassium hydroxide was added in the potassium water glass solution to be dissolved under stirring. After cooling to room temperature, stirring was continued until small amount of white precipitates were observed. The resulting solution was poured into a clean container; the white crystals were formed at room temperature for 1-20 minutes into agglomerates, which were pulverized to form a solid activator;

Mixing: the solid raw materials and the solid activator were thoroughly mixed to form mixed materials;

Pelletizing: the mixed materials were pelletized into particles;

Curing: the particles were maintained under the conditions with a temperature of room temperature to 80° C. and a humidity of 70-90% for 1-2 hours to be cured;

Drying: the cured particles were dried for 2 hours at a temperature of 100° C.;

Sintering: the dried particles were sintered at a temperature of 1300° C. Specifically, the sintering process was carried out by the steps of elevating the temperature from 100° C. at a rate of 30° C./min to 700° C., and subsequently further elevating the temperature to 1300° C. at a rate of 10° C./min.

Forming finished product: the sintered particles were cooled to room temperature to yield ceramsite as the finished product of Example 2.

Example 3

Weighing solid materials: 860 g of fly ash, 40 g of silica fume, 50 g of bauxite, 20 g of cellulose, and 10 g of a surfactant; and these solid raw materials were mixed;

Preparing a Solid Activator:

12 g of lithium hydroxide and 80 g of 92% lithium water glass solution were weighed. Lithium hydroxide was added in the lithium water glass solution to be dissolved under stirring. After cooling to room temperature, stirring was continued until small amount of white precipitates were observed. The resulting solution was poured into a clean container; the white crystals were formed at room temperature for 1-20 minutes into agglomerates, which were pulverized to form a solid activator;

Mixing: the solid raw materials and the solid activator were thoroughly mixed to form mixed materials;

Pelletizing: the mixed materials were pelletized into particles;

Curing: the particles were maintained under certain temperature and humidity conditions for 1-2 hours to be cured;

Temperature: room temperature to 80° C.;

Humidity: 70-90%;

Drying: the cured particles were dried for 2 hours at a temperature of 140° C.;

Sintering: the dried particles were sintered at a temperature of 1200° C. Specifically, the sintering process was carried out by the steps of elevating the temperature from 140° C. at a rate of 40° C./min to 700° C., and subsequently further elevating the temperature to 1200° C. at a rate of 10° C./min.

Forming finished product: the sintered particles were cooled to room temperature to yield ceramsite as the finished product of Example 3.

Example 4

Weighing solid materials: 800 g of fly ash, 30 g of Guangdong white clay, 80 g of bentonite, 10 g of sodium lignosulphonate, and 50 g of high-alumina fly ash; and these solid raw materials were mixed;

Preparing an Activator:

20 g of sodium hydroxide and 100 g of 75% sodium water glass solution were weighed. Sodium hydroxide was added in the sodium water glass solution to be dissolved under stirring. After cooling to room temperature, stirring was continued until small amount of white precipitates were observed. The resulting solution was poured into a clean container; the white crystals were formed at room temperature for 1-20 minutes into agglomerates, which were pulverized to form a solid activator;

Mixing: the solid raw materials and the solid activator were thoroughly mixed to form mixed materials;

Pelletizing: the mixed materials were pelletized into particles;

Curing: the particles were maintained under certain temperature and humidity conditions for 1-2 hours to be cured;

Temperature: room temperature to 90° C.;

Humidity: 70-90%;

Drying: the cured particles were dried for 2 hours at a temperature of 130° C.;

Sintering: the dried particles were sintered at a temperature of 1250° C. Specifically, the sintering process was carried out by the steps of elevating the temperature from 130° C. at a rate of 30° C./min to 700° C., and subsequently further elevating the temperature to 1250° C. at a rate of 10° C./min.

Forming finished product: the sintered particles were cooled to room temperature to yield ceramsite as the finished product of Example 4.

Example 5

Weighing solid materials: 750 g of fly ash, 100 g of red mud, 10 g of silica fume, and 50 g of calcite; and these solid raw materials were mixed;

Preparing an Activator:

15 g of sodium hydroxide and 80.5 g of 85% sodium water glass solution were weighed. Sodium hydroxide was added in the sodium water glass solution to be dissolved under stirring. After cooling to room temperature, stirring was continued until small amount of white precipitates were observed. The resulting solution was poured into a clean container; the white crystals were formed at room temperature for 1-20 minutes into agglomerates, which were pulverized to form a solid activator;

Mixing: the solid raw materials and the solid activator were thoroughly mixed to form mixed materials;

Pelletizing: the mixed materials were pelletized into particles;

Curing: the particles were maintained under certain temperature and humidity conditions for 1-2 hours to be cured;

Temperature: room temperature to 70° C.;

Humidity: 70-90%;

Drying: the cured particles were dried for 2 hours at a temperature of 150° C.;

Sintering: the dried particles were sintered at a temperature of 1050° C. Specifically, the sintering process was carried out by the steps of elevating the temperature from 150° C. at a rate of 20° C./min to 700° C., and subsequently further elevating the temperature to 1050° C. at a rate of 10° C./min.

Forming finished product: the sintered particles were cooled to room temperature to yield ceramsite as the finished product of Example 5.

Comparative Example 1

Weighing solid materials: 850 g of fly ash, 20 g of Guangdong white clay, and 30 g of silica fume; and these solid raw materials were mixed;

Preparing a Liquid Activator:

5 g of sodium hydroxide, 40 g of sodium water glass, and 5 g of water were weighed. Sodium hydroxide was added in the sodium water glass to be dissolved. The resulting solution was added with water and stirred to be homogenous, and then cooled to room temperature to yield a liquid activator.

Mixing: the solid raw materials and the liquid activator were thoroughly mixed to form mixed materials;

Pelletizing: the mixed materials were pelletized into particles;

Curing: the particles were maintained under certain temperature and humidity conditions for 1-2 hours to be cured;

Temperature: room temperature to 100° C.;

Humidity: 70-90%;

Drying: the cured particles were dried at a temperature of 120° C.;

Sintering: the dried particles were temperature-programmed and elevated to 1250° C. and then sintered for 60 min.

Forming finished product: the sintered particles were cooled to room temperature to yield ceramsite as the finished product of Comparative Example 1.

Comparative Example 2

Weighing solid materials: 880 g of fly ash and 70 g of bentonite; and these solid raw materials were mixed;

Preparing a Liquid Activator:

15 g of potassium hydroxide, 87 g of potassium water glass, and 8 g of water were weighed. Potassium hydroxide was added in the sodium water glass to be dissolved. The resulting solution was added with water and stirred to be homogenous, and then cooled to room temperature to yield a liquid activator.

Mixing: the solid raw materials and the liquid activator were thoroughly mixed to form mixed materials;

Pelletizing: the mixed materials were pelletized into particles;

Curing: the particles were maintained under certain temperature and humidity conditions for 1-2 hours to be cured;

Temperature: room temperature to 80° C.;

Humidity: 70-90%;

Drying: the cured particles were dried for 2 hours at a temperature of 100° C.;

Sintering: the dried particles were sintered at a temperature of 1300° C. for 60 min.

Forming finished product: the sintered particles were cooled to room temperature to yield ceramsite as the finished product of Comparative Example 2.

Comparative Example 3

Weighing solid materials: 800 g of fly ash, 30 g of Guangdong white clay, 80 g of bentonite, 10 g of sodium lignosulfonate, and 50 g of high-alumina fly ash; these solid raw materials were mixed, and the resulting mixture was added with 8 g of water and stirred to be homogenous;

Pelletizing: the solid raw materials added with water were pelletized into particles;

Curing: the particles were maintained under certain temperature and humidity conditions for 1-2 hours to be cured;

Temperature: room temperature to 90° C.;

Humidity: 70-90%;

Drying: the cured particles were dried for 2 hours at a temperature of 130° C.;

Sintering: the dried particles were sintered at a temperature of 1250° C. for 80 min.

Forming finished product: the sintered particles were cooled to room temperature to yield ceramsite as the finished product of Comparative Example 3.

Comparative Example 4

Weighing solid materials: 750 g of fly ash, 100 g of red mud, 10 g of silica fume, and 50 g of calcite; these solid raw materials were mixed, and the resulting mixture was added with water and stirred to be homogenous;

Pelletizing: the solid raw materials added with 12 g of water were pelletized into particles;

Curing: the particles were maintained under certain temperature and humidity conditions for 1-2 hours to be cured;

Temperature: room temperature to 70° C.;

Humidity: 70-90%;

Drying: the cured particles were dried for 2 hours at a temperature of 150° C.;

Sintering: the dried particles were sintered at a temperature of 1050° C. for 90 min.

Forming finished product: the sintered particles were cooled to room temperature to yield ceramsite as the finished product of Comparative Example 4.

The ceramsites as the finished products obtained in Examples 1-5 and Comparative Examples 1-4 were tested. The results for the properties of the tested samples were shown below:

| | Bulk density $(kg/m^3)$ | Cylindrical compressive strength (MPa) | Water absorption (%) |
|---|---|---|---|
| Example 1 | 908 | 15.3 | 6.4 |
| Example 2 | 894 | 13.5 | 8.6 |
| Example 3 | 960 | 17.1 | 5.2 |
| Example 4 | 1056 | 19.7 | 3.6 |
| Example 5 | 720 | 11.6 | 9.3 |
| Comp. Exp. 1 | 1020 | 15.6 | 5.6 |
| Comp. Exp. 2 | 980 | 14.1 | 4.0 |
| Comp. Exp. 3 | 850 | 7.2 | 9.1 |
| Comp. Exp. 4 | 730 | 6.8 | 10.3 |

The above data show that in the case where the bulk densities are close, Examples 1-5 of the present invention, in which a solid activator is used, have equivalent or even better properties regarding the cylindrical compressive strength and water absorption as compared with Comparative Examples 1-2, in which a liquid activator is used; and Examples 1-5 of the present invention have significantly better properties than Comparative Examples 3-4, in which no activator is used.

The foregoing illustrations merely represent the preferred embodiments of the present invention, while the protection scope of the present invention is not limited thereto. Any modifications or replacements within the technical scope disclosed by the present invention that could be easily envisaged by persons skilled in the art should be covered by the protection scope of the present invention. Therefore, the protection scope of the present invention should be defined by the protection scope of the claims.

The invention claimed is:

1. A lightweight high-strength ceramsite, comprising solid raw materials and solid activator as raw materials, which can be respectively expressed in parts by weight, the solid raw materials:100 parts, the activator: 1-15 parts, characterized in that said solid raw materials comprise fly ash: 100 parts, high-alumina fly ash, bauxite and red mud: 6-18 parts, silica fume: 1-5 parts, surfactant: 0.1-3 parts, plasticizer: 6-24 parts; and said activator comprises alkali metal hydroxide: 5-20 parts and 60-95% by weight of alkali metal silicate solution: 80-95 parts.

2. The lightweight high-strength ceramsite according to claim 1, characterized in that said fly ash comprises the following components, loss on ignition: 2-10%, $SiO_2$: 30%-70%, $Al_2O_3$:10%-50%, CaO: 1%-15%, $Fe_2O_3$: 1%-18%, MgO: 0.01%-8%, and $TiO_2$: 0.01%-3%.

3. The lightweight high-strength ceramsite according to claim 1, characterized in that said plasticizer is one or more selected from the group consisting of Guangdong white clay, Guangdong black clay, kaolin, bentonite, PVA, and cellulose.

4. The lightweight high-strength ceramsite according to claim 1, characterized in that said high-alumina fly ash and bauxite comprise an alumina content of not less than 37%; and the weight ratio of red mud to high-alumina fly ash and bauxite is 1:2-5.

5. The lightweight high-strength ceramsite according to claim 1, characterized in that said solid raw materials further comprise iron ore tailings: 0.01-5 parts and calcite: 0.01-5 parts.

6. The lightweight high-strength ceramsite according to claim 1, characterized in that said alkali metal hydroxide is one or more selected from the group consisting of sodium hydroxide, potassium hydroxide and lithium hydroxide; and said alkali metal silicate in the alkali metal silicate solution is one or more selected from the group consisting of sodium silicate, potassium silicate and lithium silicate.

7. The lightweight high-strength ceramsite according to claim 1, characterized in that said surfactant is sodium lignosulfonate.

8. A method for preparing lightweight high-strength ceramsite, characterized in comprising the following steps:
   a. Weighing solid raw materials comprising fly ash: 100 parts, high-alumina fly ash, bauxite and red mud: 6-18 parts, silica fume: 1-5 parts, surfactant: 0.1-3 parts, plasticizer: 6-24 parts, and mixing the same, and preparing a solid activator: dissolving alkali metal hydroxide in an alkali metal silicate solution, after cooling to room temperature, stirring until a small amount of white precipitates are observed, pouring the resulting solution into a clean container; white crystals are formed at room temperature for 1-20 minutes into agglomerates, which are pulverized to form the solid activator;
   b. Mixing: mixing the solid raw materials and the solid activator thoroughly to form mixed materials;
   c. Pelletizing: pelletizing the mixed materials into particles;
   d. Curing: maintaining the particles under the conditions with a temperature of 70-100° C. and a humidity of 70-90% for 1-2 hours to be cured;
   e. Drying: drying the cured particles at a temperature of 100-300° C.;
   f. Sintering: subjecting the dried particles to a predetermined sintering process for 60-90 min;
   g. Forming finished product: cooling the sintered particles to room temperature to yield a lightweight high-strength ceramsite according to claim 1.

9. The method for preparing lightweight high-strength ceramsite according to claim 8, characterized in that the sintering process comprises specific steps of elevating the temperature from 100-300° C. at a rate of 20-40° C./min to 500-700° C., and subsequently further elevating the temperature to 1050-1350° C. at a rate of 5-25° C./min.

\* \* \* \* \*